United States Patent [19]
Mendez

[11] Patent Number: 6,123,968
[45] Date of Patent: Sep. 26, 2000

[54] COMPOSITION FOR EXTENDING SHELF LIFE FOR FRESH FRUITS AND VEGETABLES WITHOUT THE USE OF REFRIGERATION

[76] Inventor: Alejandro Mendez, 8260 NW. 58 St., Miami, Fla. 33166

[21] Appl. No.: 09/274,168

[22] Filed: Mar. 23, 1999

[51] Int. Cl.$^7$ .................................................. A23B 7/155
[52] U.S. Cl. .............................. 426/321; 426/52; 426/61; 426/310; 426/321; 426/333; 426/335; 426/429; 426/615; 426/616; 426/655
[58] Field of Search ................. 426/429, 52, 61, 426/310, 321, 333, 335, 655, 615, 616

[56] References Cited

U.S. PATENT DOCUMENTS 5,792,461   8/1998   Bok et al. ................................ 426/429

FOREIGN PATENT DOCUMENTS 08224071   9/1996   Japan .

*Primary Examiner*—Helen Pratt
*Attorney, Agent, or Firm*—Brinkley, McNerney, Morgan, Solomon & Tatum, LLP

[57] ABSTRACT

A method of producing and using a solution for extending the shelf life of fresh fruits and vegetables after they are harvested which includes the steps of extracting juice from fruits or vegetables, filtering the juice, disintegrating the peel, extracting enzyme from the disintegrated peels using a solvent without denaturing the enzymes, removing the disintegrated peels and mixing the remaining ingredients with the extracted juice.

11 Claims, 5 Drawing Sheets

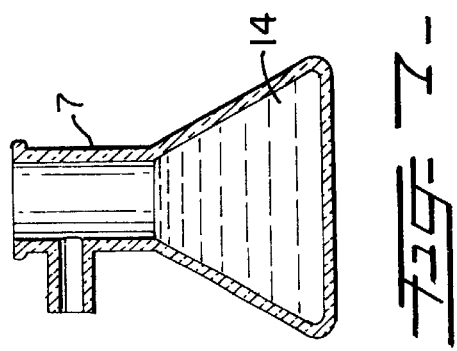
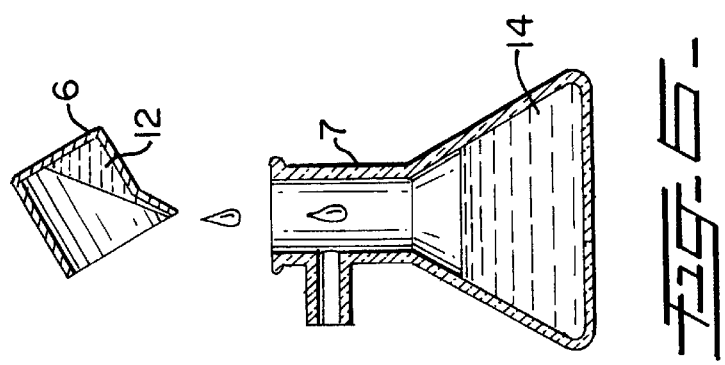
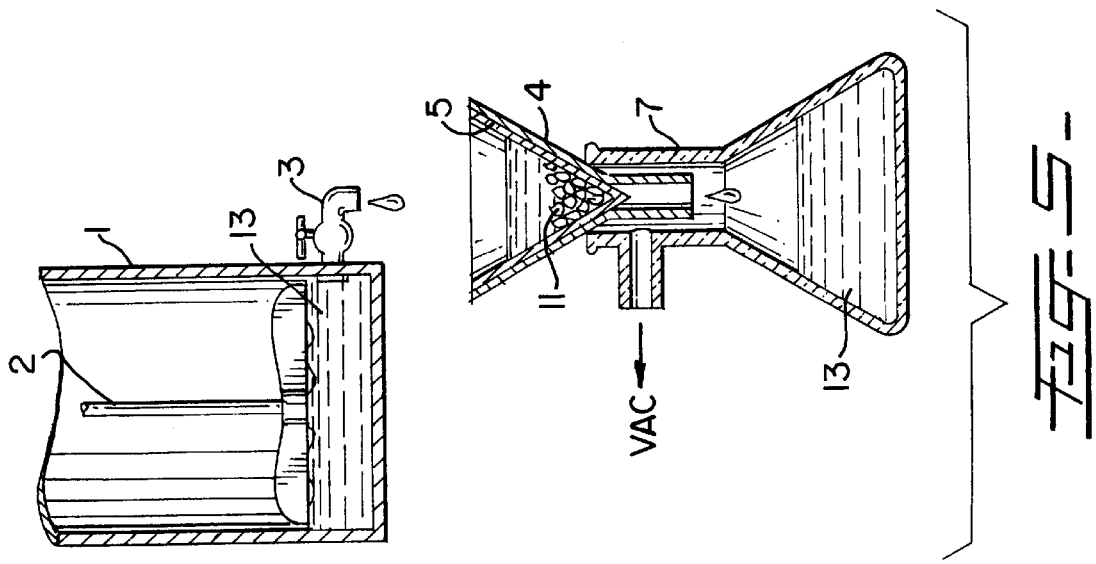

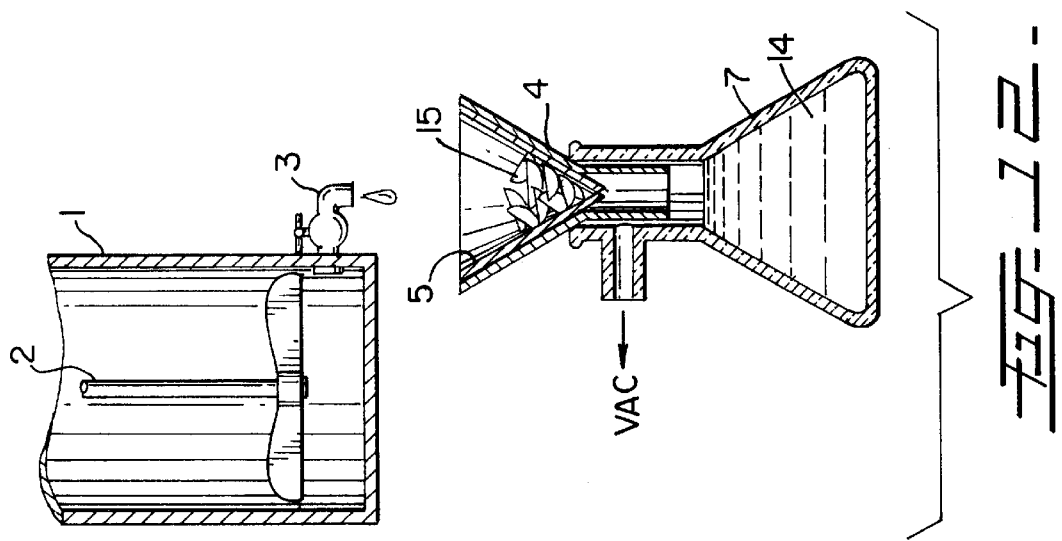
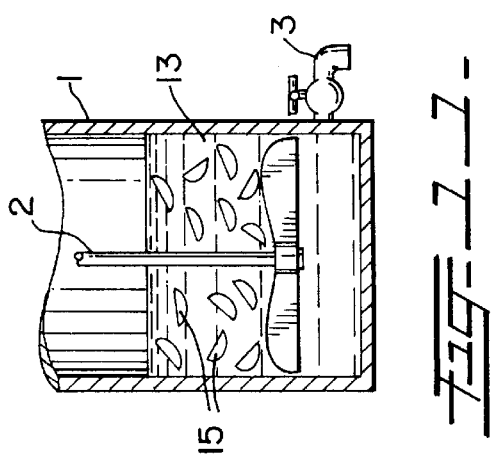
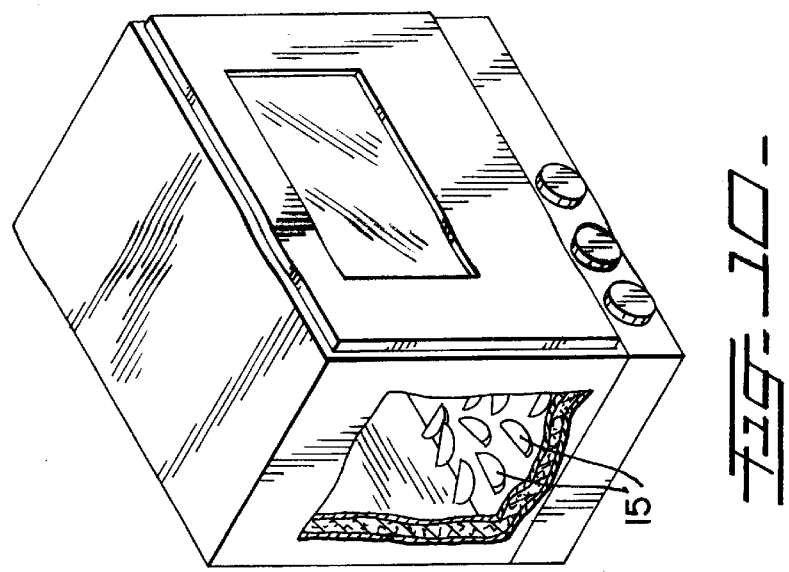

COMPOSITION FOR EXTENDING SHELF LIFE FOR FRESH FRUITS AND VEGETABLES WITHOUT THE USE OF REFRIGERATION

BACKGROUND OF THE INVENTION

1. Field of the Invention

The field of the invention is vegetable and fruit storage, freshness and ripening.

2. Description of Related Art

Since the beginning of mankind, agriculture has always played a major role in the everyday life of man—particularly to fresh fruits and vegetables that are easily harvested. Modern agriculture has increased productivity in agriculture but has never reduced the huge losses in the post-harvest of fresh fruits and vegetables. These post-harvest losses are not new; they have always been a problem for mankind. In these days of rapidly enlarging populations in the poorest countries whose food supply is already short, the problem of post-harvest losses of fresh fruits and vegetables has become increasingly critical. Currently these post-harvest losses amount to thirty-five percent (35%) in industrialized countries to seventy percent (70%) in under developed countries.

In the early days of horticulture in today's industrialized countries, heavy losses occurred in much the same manner as they do today in developing countries. Increasing industrialization in technologically-advanced nations gradually brought improvements in crop handling. Elaborate harvesting equipment replaced the crude harvesting tools. Collection centers were strategically established in major producing areas. Containers were remodeled to add more protection to the fresh fruits and vegetables. Commercial storage plants were installed and grade standards adopted. Engineers and economists became more and more aware of raw material behavior. Advances in refrigeration technology in the developed countries made possible the establishment of cold chains for the entire post-harvest and handling operations. At the institutional level, post-harvest research was initiated. Pilot packing houses were installed, coupled with the development on intensive training programs. The improvement of product quality and reduction in post-harvest losses became the main concern of producers, middleman, marketing specialists and consumers. Today, enormous volumes of quality horticultural fruit and vegetable crops produced in technologically advanced countries are made available to millions of people through improved post-harvest handling. Thus, historically and by necessity, post-harvest technology is part of the normal development processes in agriculture.

These handling processes are not fully recognized in less-developed countries. In such countries, agriculture may be characterized as disjointed. Production is not linked with marketing. With highly perishable crops like fruits and vegetables; storage, packing, transport, and handling technologies are practically non-existent. Hence, considerable amounts of fresh fruits and vegetables are lost after harvest. Post-harvest, loss-prevention technology measures have become more important than ever.

It is distressing to note that so much time is being devoted to the culture of the plant, so much money spent on irrigation, fertilization, and crop protection measures, only to be wasted about a week after harvest. It is, therefore, more important that post-harvest technology and processes be given much more attention than production practices.

Fresh fruits and vegetables have many similarities with respect to their compositions, methods of cultivation and harvesting, storage properties, and processing. In fact, many vegetables may be considered fruit in the true botanical sense. Botanically, fruits are those portions of the plant which house seeds. Therefore, such items as tomatoes, cucumbers, eggplants, peppers and others would be classified as fruits on this basis. However, the important distinction between fruit and vegetables has come rather to be made on usage basis. Those plant items that are generally eaten with the main course of a meal are considered to be "vegetables". Those that are commonly eaten as dessert are considered "fruits". This artificial distinction is made by the food processor, certain marketing laws, and the consuming public.

Fruit contains natural acids, such as citric acid in oranges and lemons, malic acid of apples, and tartaric acid of grapes. These acids give the fruits tartness and slow down bacterial spoilage. Organic acids also influence the color of fruits since many plant pigments are natural pH indicators. Carbohydrates are the main component of fruits and vegetables and represent 90% of their dry matter. Water is also present in fruits (between 80 to 90%) and in vegetables (generally, between 90 to 96%). More mineral substances are present in vegetables than in fruits; but enzymes that are present in all fresh fruits and vegetables are the biological catalyst that promote most of the biochemical reactions which occur in fresh fruits and vegetables.

Some properties of enzymes in fresh fruits and vegetables are the following.

1. In living fresh fruits and vegetables, enzymes control the reactions associated with ripening.

2. After harvest (unless destroyed by heat, chemicals, or some other means), enzymes continue the ripening process. In many cases, fruit ripens to the point of spoilage, such as soft melons or overripe bananas.

3. Because enzymes enter into a vast number of biochemical reactions in fresh fruits and vegetables, enzymes may be responsible for changes in flavor, color, texture, and nutritional properties.

4. The heating processes in fresh fruits and vegetables manufacturing and processing are designed not only to destroy micro-organisms, but also to deactivate enzymes and so improve the fruit and vegetables storage stability.

Once the fruit or vegetable has left the tree, the organoleptic properties, nutritional value, safety, and aesthetic appeal of the fruit deteriorates in varying degrees. The major causes of deterioration include the following:

(a) growth and activity of micro-organisms;

(b) activities of the natural food enzymes;

(c) insects, parasites, and rodents;

(d) temperature, both heat and cold;

(e) moisture and dryness;

(f) air and in particular oxygen;

(g) light; and (h) time.

The rate at which foods spoil, if proper measures are not taken, is indicated in table 1.0 below. The table shows the time in days of the generalized storage life at seventy degrees fahrenheit (70° F.) with a normal humidity of 60%.

| FOOD PRODUCTS | GENERALIZED STORAGE LIFE (DAYS) AT 21° C. (70° F.) |
|---|---|
| Animal flesh, fish, poultry | 1–2 |
| Dried, salted, smoked meat and fish | 360 and more |
| Fruits | 1–7 |
| Dried fruits | 360 and more |
| Leafy vegetables | 1–2 |
| Root crops | 7–20 |

As soon as produce is harvested, the processes leading to breakdown begin, and cannot then be stopped; the rate at which breakdown occurs can, however, be slowed to minimize losses. The most common commercial methods to slow down the enzymatic processes follow:

1. Refrigeration at all points of receiving, distributing, and retailing the fresh fruit and vegetables. However, this is a very expensive method, yet is the most common. Only 15 to 20% of all harvested fruits and vegetables use refrigeration.
2. Care to prevent cutting or bruising of the fruit and vegetables during picking or handling.
3. Packaging or storage to control respiration rate and ripening of fruits and vegetables.
4. Use of preservatives to kill micro-organisms on the fruits and vegetables. In other words, fungicides are applied as food waxes with the excuses that they will improve the appeal of the fruits and vegetables with the consumers.

Fruits can be classified as climacteric and non-climacteric. Climacteric and non-climacteric represent two distinct patterns of ripening. In non-climacteric fruits the process of maturation and ripening is a continuous but gradual process. In contrast, the climacteric fruit undergo a rapid ripening phase when triggered by enzymatic changes. The onset of climacteric ripening is thus a well defined event marked by rapid increase in the rate of respiration and the natural evolution of ethylene gas by the fruit at a point in its development known as the respiratory climacteric. The importance of the respiratory climacteric is that fruits such as bananas may be held at a reasonable temperature when in the green state, but, as they begin to ripen, they will rapidly increase their respiration and generate much more heat. The consequence may be that this heating cannot be controlled and even more respiration will occur in a chain reaction, rapidly leading to spoilage of the fruit in a very short time. Once climacteric fruits start to ripen, very little can be done except to market them for immediate consumption. Ethylene is present in all fruit and is recognized as the central fruit ripening hormone which, in climacteric fruits, can actually initiate ripening when present at concentrations as low as one-tenth to ten parts per million (0.1–10 ppm).

Non-climacteric fruits also respond to ethylene application by increasing their respiration rate. However, the actual ripening process is triggered by the fruit itself. As well as being involved in ripening and increasing the respiration in fruits, ethylene also plays an important role in all plant materials and is produced in response to stress from wounds and injuries. In other words, ethylene produced by wounding or stressing may also trigger ripening in the damaged fruit as well as the undamaged fruits around it. Damage one green fruit in a box and the whole box load may ripen prematurely. For this reason, good ventilation of fresh fruits with fresh air, refrigerated if necessary, is vital to ensure that ethylene levels do not build up to significant levels during storage and transport. Ethylene can also adversely affect certain Vegetables. Carrots for example develop bitter flavors. Parsley and other leafy herbs will rapidly wilt when exposed to ethylene in stores and during retail display. Table 1.1 gives listings of common climacteric and non-climacteric fruit and vegetable fruits.

| | Climacteric | Non-Climacteric |
|---|---|---|
| TEMPERATE FRUIT | Apple | Cherry |
| | Pear | Grape |
| | Peach | Strawberry |
| | Apricot | |
| | Plum | |
| VEGETABLE FRUIT | Melon | Cucumber |
| | Tomato | |
| | Watermelon | |
| COMMON TROPICAL FRUIT | Avocado | Orange |
| | Banana | Grapefruit |
| | Mango | Lemon |
| | Papaya | Lime |
| | Fig | Olive |
| | Guava | Pineapple |
| | Passion fruit | Litchi |
| | Persimmon | |
| LESS COMMON TROPICAL FRUIT | Cherimoya | Cashew apple |
| | Soursop | Java plum |
| | Breadfruit | Other Eugenia sp |
| | Jackfruit | |
| | Mamey apple | |
| | Sapote | |

For all of the above-mentioned reasons and facts, the huge losses of fresh fruits and vegetables are a worldwide problem that needs to be solved with an inexpensive and simple method of application. Thus, there is clearly the worldwide need for the present application in that it is going to create an impact as large as the introduction of refrigeration to the worldwide, fresh fruit and vegetable industry.

SUMMARY OF THE INVENTION

The invention applies a process that naturally retards the enzymatic processes of ripening that occur in all fresh fruits and vegetables. The invention encompasses methods of making solutions, the solutions themselves, and the method of using the solutions.

The naturally-occurring process being harnessed is the retarding of ripening in fruits and vegetables. Enzymes are protein catalysts that regulate chemical reactions in fruits and vegetables. Fruits and vegetables contain enzymes that advance ripening. Fruits and vegetables also contain enzymes that retard ripening. The enzymes that advance and the enzymes that retard tend to offset each other. In most fruits and vegetables, both types of enzymes are present. An object of the invention is to harness the enzymes that retard ripening. Another object of the invention is to reduce the effects of the enzymes that advance ripening.

In certain fruits and vegetables, the ratio of positive enzymes versus negative enzymes is greater than one. The fruits and vegetables with greater ratios are better suited for raw materials used to prepare the solution. Examples of fruits having greater ratios are limes, garlic, and onions. The following fruits and vegetables have been found to have produced efficacious solutions: limes, oranges, grapefruits, lemons, tangerines, pineapples, onions, and garlic. Solutions made from combinations of the above-listed fruits and vegetables also work. The best time to process the fruits and vegetables to make a solution is when the fruits and vegetables have just ripened.

Also, some of the natural ingredients of the solution made out of fresh lime peels are very effective in controlling or killing surface bacteria, mold, and yeast which also can shorten the lifetime of the fruit.

Also, the naturally-found ingredient, d-limonene, is an excellent insect repellent. D-limonene is in relatively-high concentrations in limes. This also will increase the lifetime of the fresh fruit due to a lessening of the susceptibility of the skin to attack by insects. Flying insects rarely attack a lime tree or the limes within the lime tree because they contain d-limonene.

The fruit enzymes are responsible for the many changes to the color, the odor, the taste, and the ripening of the fresh fruits. Once these enzymes become neutralized by other enzymes, the shelf life of the fresh fruits and vegetables can be extended from three to eight weeks depending on the fruit. The metabolism of the fruit will slow down by about 90%, causing the ripening and decaying process to slow down.

A method of producing the solution involves the following steps. First, the juice is extracted from the fruit or vegetable. Next, the juice is filtered. Next, any remaining peels are disintegrated. Next, the enzymes in the disintegrated peels are extracted with a solvent. The solvent should be chosen by its ability to dissolve as much of the enzymes as possible, while not dissolving the other fruit or vegetable components. The solvent should not denature the enzyme. A ten-percent (10%) aqueous ethyl-alcohol solution is an example of a suitable solvent. Next, the disintegrated peels should be stirred in the solution allowing for full absorption of the enzymes into the solvent. Next, the solution and any disintegrated peels should be separated by a suitable method such as filtering. Next, the juices separated earlier can be added to the solution. The amount of dilution is governed by factors such as the method of application and the type of fruit or vegetable being protected. Next, food color can be added to the solution to improve the solution aesthetically. Next, a wax can be dissolved into the solution. The wax helps the application of the solution to the fruit or vegetable and its adhesion to the fruit or vegetable. Next, the solution can be quality controlled. In quality control, the amount of enzymes can be verified as well as any other ingredients. In addition, during quality control, the amount of contaminants can be verified. Finally, the solution is packaged for use or distribution.

Because the solution utilizes plant enzymes that denature at around one hundred-thirty degrees Fahrenheit (130° F.), the process of making the solution is always done near room temperatures. The results retain ninety to ninety-five percent (90–95%) of the enzymes that are found in the natural state of the extracted fruit or vegetable.

Another method to create this solution out of fresh peels of fruits and vegetables follows: removing the peels from said fruits and vegetables; drying the peels; extracting the enzymes from the peels in a suitable solvent such as a ten-percent (10%) aqueous ethyl-alcohol solution; and separating the peels from the solution. The resulting solution is relatively weak compared to the solution made by the previous process. However, the solution made from dried peels is still efficacious. The solution produced can be used similarly to the previous solution but cannot be diluted as much as the previous solution because the concentration of enzymes is not as great.

The invention includes the solution made by the previous methods.

The method of applying the solution is very simple. After the fresh fruits and vegetables are washed at the picking source, they are put into a bath of this solution for a period of one minute, dried, and then packed for sale or distribution according to the following chart:

| HARVESTING | | | |
|---|---|---|---|
| Post-Harvesting (Transport, Storage, Etc.) | | | |
| DISTRIBUTION | | | |
| (Except for on Farm Consumption) | | | |
| Fresh Local Market | Processing Finished Products | Fresh Export Shipping | Semiprocessing Semiprocessed Products |
| Domestic Market | Export Market | Domestic Market | Export Market |
| | | Export Market | |

This chart shows that the application of this natural solution made out of fresh peels has to be at the source, at the farms, and not at the distribution centers. The reason for the earlier application of the solution is because many fruits may have already been bruised before reaching the distribution center.

The results obtained with this solution without the use of refrigeration at a room temperature of seventy-eight degrees fahrenheit (78 °F.) and at a normal humidity of sixty percent (60%) are summarized in the following table:

| | | |
|---|---|---|
| 1. | Tomatoes | 4 to 8 weeks |
| 2. | Bananas | 3 to 6 weeks |
| 3. | Grapes | 3 to 6 weeks |
| 4. | Apples | 3 to 6 weeks |
| 5. | Pineapples | 3 to 6 weeks |
| 6. | Oranges | 4 to 6 weeks |
| 7. | Grapefruits | 4 to 6 weeks |
| 8. | Tangerines | 4 to 6 weeks |
| 9. | Plums | 4 to 6 weeks |
| 10. | Peaches | 4 to 6 weeks |
| 11. | Papayas | 3 to 6 weeks |
| 12. | Mangos | 4 to 6 weeks |
| 13. | Apricots | 4 to 6 weeks |
| 14. | Nectarines | 4 to 6 weeks |
| 15. | Plantains | 3 to 6 weeks |
| 16. | Pears | 4 to 6 weeks |
| 17. | Potatoes | 4 to 8 weeks |
| 18. | Tobacco Leaves | 4 to 8 weeks |

A series of solutions, each made from fresh disintegrated peels of a different fruit, created an effect with different duration on shelf life of these fruits. Generally, the best results were achieved by the lime peel solution. Another highly effective solution was made out of fresh peels of onions. Fresh peels of garlic displayed good results, too.

This invention eliminates the huge losses experienced by the fruit and vegetable industry to a level of five to ten percent (5–10%) since many fruits are lost post harvest due to bruising, exposure to the sun, sudden change of temperatures, and bad roads during transportation. Many losses are avoided with the application of this solution.

In accordance with these and other objects which will become apparent hereinafter, the instant invention will now be described with particular reference to the accompanying drawings.

BRIEF DESCRIPTION OF THE DRAWINGS

FIG. 5 is a side cutaway view of an extractor emptying into a vacuum filter wherein the solution is separated from any peels.

FIG. 6 is a side cutaway view showing the originally extracted juice being mixed with the solution.

FIG. 7 is a side cutaway view of the solution made from the original extraction solution and the added juice.

FIG. 10 is a side, partial-cutaway view showing the interior of a vacuum oven as peels are being dried.

FIG. 11 is a side cutaway view showing a solution using dried peels.

FIG. 12 is a side cutaway view showing the solution separated from the peels.

DETAILED DESCRIPTION OF THE PREFERRED EMBODIMENTS

Figure 1:
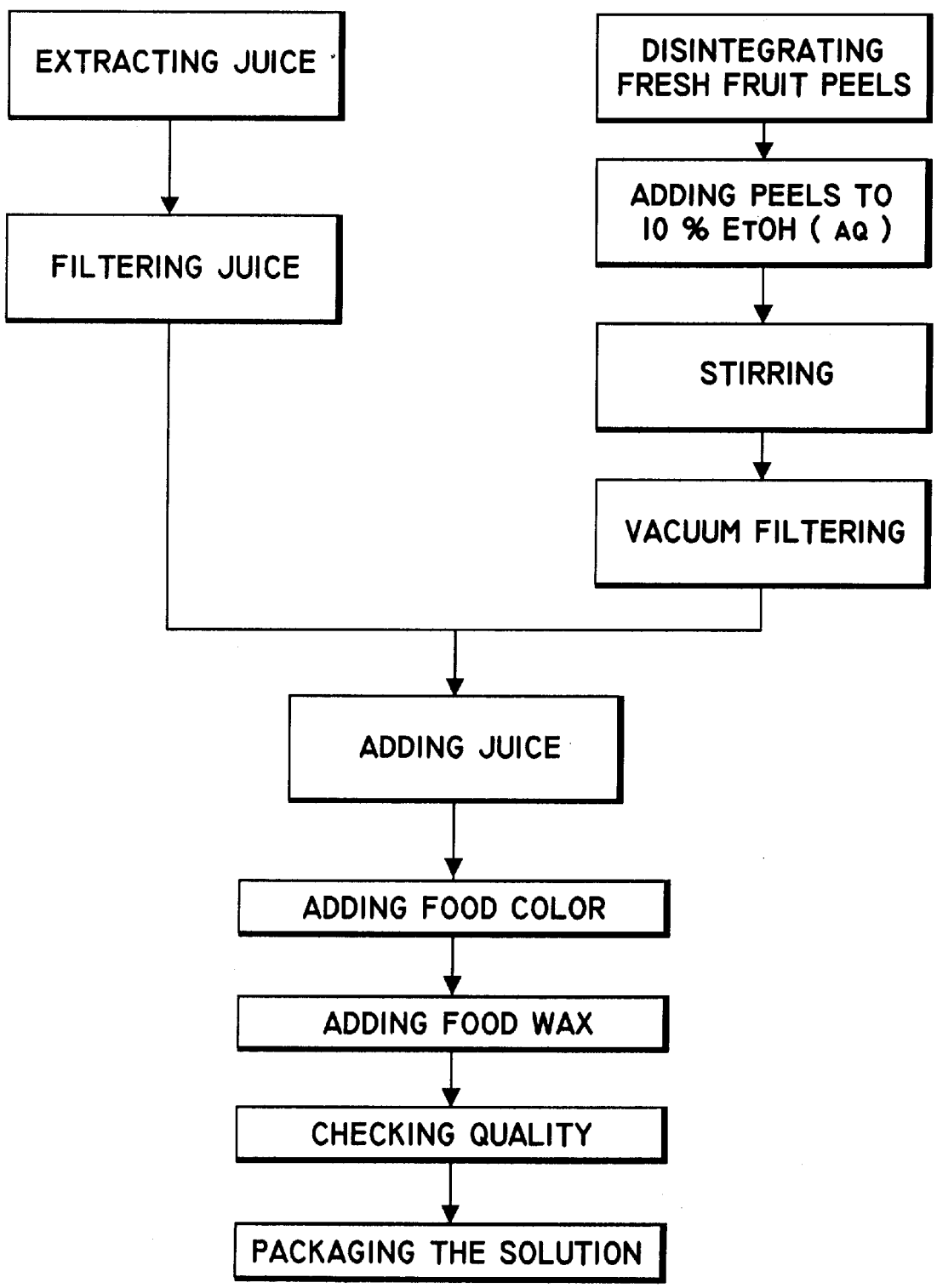
FIG. 1 is a flow chart of a method of making a solution that preserves fruits and vegetables.
Figure 4:
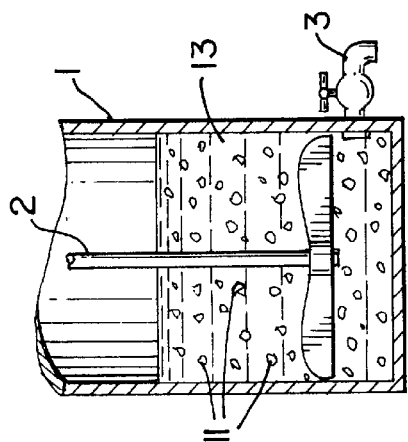
FIG. 4 is a side cutaway view of an extractor wherein the disintegrated peel has been extracted in a solution.
Figure 3:
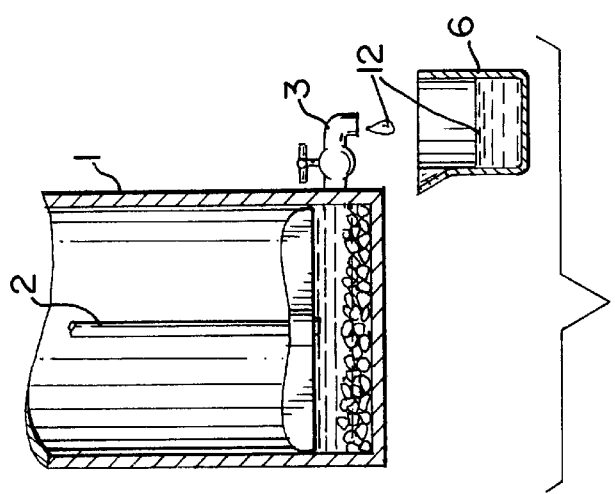
FIG. 3 is a side cutaway view of an extractor after extraction.
Figure 2:
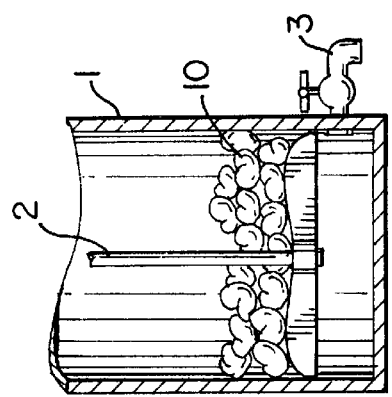
FIG. 2 is a side cutaway view of an extractor before extraction.
Figure 8:
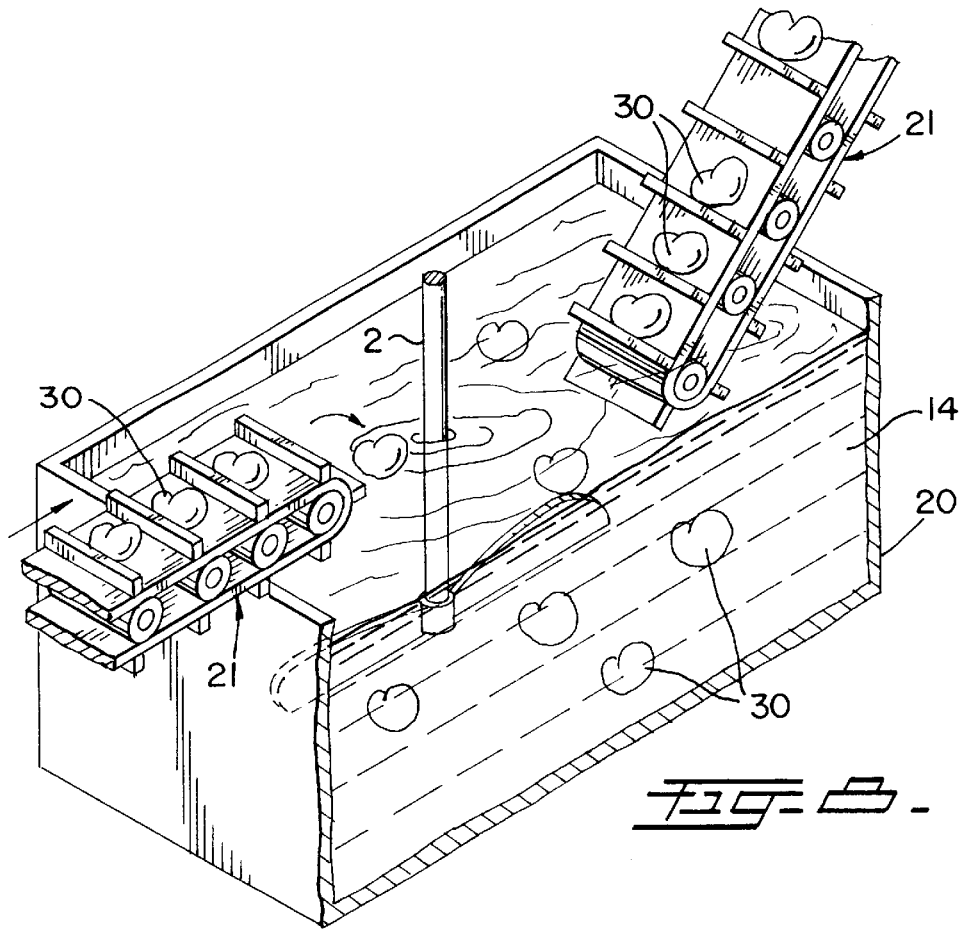
FIG. 8 is a side view of a vat application system.
Figure 9:
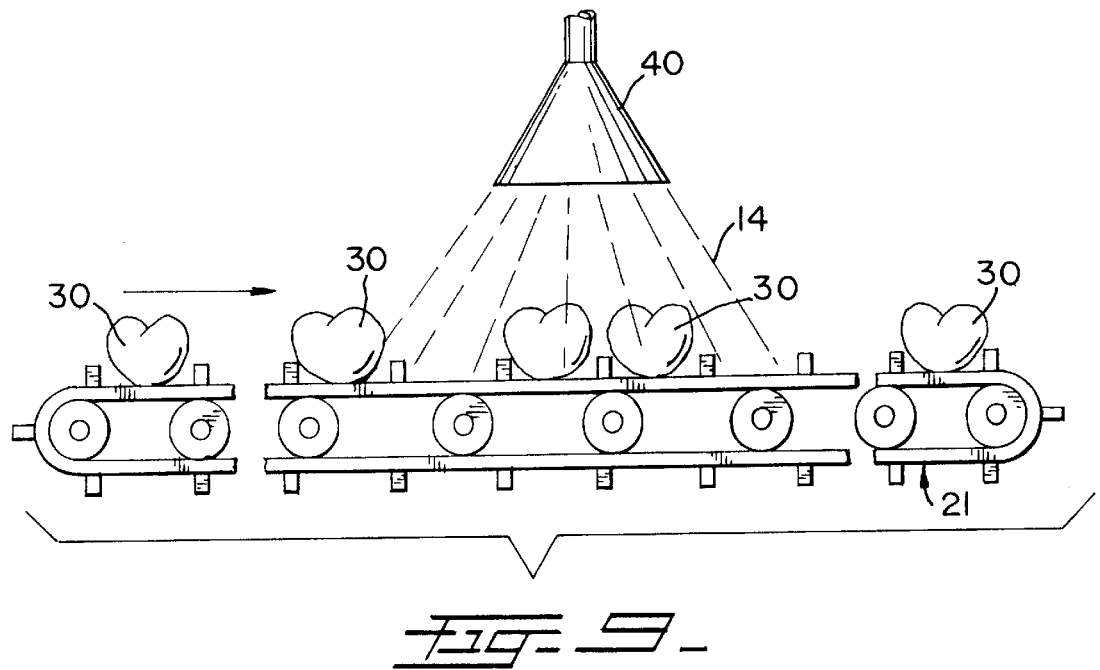
FIG. 9 is a side view of a spray application system.

This invention is directed to a process that slows down the natural enzymatic changes that occur in fresh fruits and vegetables after they are harvested from the tree. The process results in the extension of the shelf life of fresh fruits and vegetables for a period of three to eight weeks without the use of refrigeration. The process includes the following steps:

extracting the juice from the fresh fruit using a commercial juice extractor;

filtering immediately the juice, disintegrating the fresh fruit peels out of limes;

adding the disintegrated fresh fruit lime peels to an industrial water tank containing 10% aqueous ethyl alcohol solution;

stirring ingredients for one hour; and vacuum filtering ingredients or any other suitable pressure application;

adding the fresh squeezed filtered juice extracted before in a ratio of 5 to 1;

adding any FDA-approved food color;

adding any FDA-approved food wax that can be diluted with water so final solution can be applied to the skin of fresh fruits and vegetables without resistance;

conducting quality control checks for brix counts, acidity, bacteria plate counts, enzyme plate counts, color, odor, taste, texture, weight, sediments, citric acid, ascorbic acid, d-limonene, and ketones;

packing the solution in containers such as 5,000 gallon tankers or 55 gallon drums.

The above-described solution can be applied to the above-listed fruits and vegetables to extend shelf life without refrigeration.

A second preferred embodiment is a method of making a solution of enzymes extracted from the dry peels of limes comprising the following steps: drying the peels in vacuum oven at seventy degrees celsius (70° C.); adding water and ethyl alcohol to the dry peels while keeping at sixty to seventy degrees celsius (60° C.–70° C.) for three hours; and then vacuum filtering. The resulting solution is relatively weak compared to the product made by the previous process but still effective. The results were eighty percent (80%) less effective than the solution obtained with the fresh disintegrated lime peels.

The preferred embodiments of the solution are the solutions made by the above-described preferred embodiments of the methods to make solutions.

The invention encompasses a method of extending shelf-life which includes adding the solution made to fruits and vegetables.

The invention encompasses a fresh peel extraction process using any of the other fruits and vegetables named above.

The invention encompasses a method of extending the shelf life of fruits and vegetables without refrigeration using the application of these other fresh peel fruit solutions to the fresh fruits and vegetables named above.

The invention also encompasses a method of extending shelf life without refrigeration comprising applying dry peel fruit solutions to the fresh fruits and vegetables named above.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of making a solution that extends the shelf life of fruits and vegetables comprising:

extracting juice from a fruit or vegetable from the group of fruits and vegetables consisting of limes, garlic, onions, oranges, grapefruits, lemons, tangerines, pineapples;

filtering the juice, disintegrating peels from the fruit or vegetable from which the juice has been extracted, adding the disintegrated peels to a solvent;

stirring, filtering, and combining the juice with the solvent.

2. A method as described in claim 1, wherein the juice is filtered immediately after the extracting step.

3. A method as described in claim 1, wherein said solvent is a ten percent aqueous ethyl-alcohol solution.

4. A method as described in claim 1, wherein said stirring is conducted for at least one hour.

5. A method as described in claim 1, wherein said filtering is vacuum filtering.

6. A fruit or vegetable solution made by the method described in claim 1.

7. A method of extending the shelf life of fruits and vegetables by applying the solution described in claim 1 to the fruit or vegetable after wetting the surface thereof.

8. A process for making a natural solution that slows down the natural enzymatic changes that occur in fresh fruits and vegetables after they are harvested from the tree, wherein the process results in the extension of the shelf life of fresh fruits and vegetables without the use of refrigeration, wherein the process includes the following steps:

extracting juice from a fruit or vegetable from the group consisting of limes, garlic, onions, oranges, grapefruits, lemons, tangerines, and pineapples, filtering the juice, disintegrating peels from the fruit or vegetable from which the juice has been extracted, adding the disintegrated peels to a tank containing water and ten percent (10%) aqueous ethyl-alcohol, stirring the disintegrated peels, water and ethyl-alcohol for one hour and vacuum filtering same, adding the juice to the water and ethyl alcohol in a ratio of 5 to 1, adding any FDA approved food color, adding any FDA approved food wax that can be diluted with water so the solution can be applied to the skin of fresh fruits and vegetables without resistance, and packing the solution in containers such as 5,000 gallon tankers or 55 gallon drums.

9. A fruit or vegetable solution made by the method described in claim 8.

10. A method of extending the shelf life of fruits and vegetables without refrigeration by applying the fruit solution described in claim 8 comprising:

wetting the surface of the skin of any of the following fruits and vegetables; tomatoes, bananas, grapes, apples, pineapples, oranges, grapefruits, tangerines, plums, peaches, papayas, mangos, apricots, nectarines, plantains, pears, potatoes, or tobacco leaves, for a period of 60 seconds with the fruit solution made by the method described in claim 8.

11. A method of extending the shelf life without refrigeration as described in claim 10 wherein said solution is made from a plurality of types of fruit.

\* \* \* \* \*